(12) United States Patent  (10) Patent No.: US 8,689,441 B2
Guo et al.  (45) Date of Patent: Apr. 8, 2014

(54) METHOD FOR MACHINING A SLOT IN A TURBINE ENGINE ROTOR DISK

(75) Inventors: Changsheng Guo, South Windsor, CT (US); Trevor S. Smith, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 288 days.

(21) Appl. No.: 13/313,846

(22) Filed: Dec. 7, 2011

(65) Prior Publication Data

US 2013/0145620 A1  Jun. 13, 2013

(51) Int. Cl.
*B23P 15/04* (2006.01)
*B21K 25/00* (2006.01)

(52) U.S. Cl.
USPC ........... 29/889.2; 29/889; 29/557; 29/558; 416/219 R

(58) Field of Classification Search
USPC ............ 29/889, 889.2, 557, 558; 407/42, 53, 407/54, 60; 416/219 R
See application file for complete search history.

(56) References Cited

U.S. PATENT DOCUMENTS

| | | | |
|---|---|---|---|
| 3,970,538 A | 7/1976 | Lucas | |
| 4,701,105 A | 10/1987 | Cantor et al. | |
| 4,824,328 A | 4/1989 | Pisz et al. | |
| 5,403,156 A | 4/1995 | Arness et al. | |
| 5,688,108 A | 11/1997 | Dierksmeier et al. | |
| 5,846,054 A | 12/1998 | Mannava et al. | |
| 6,109,877 A | 8/2000 | Gekht et al. | |
| 6,315,298 B1 | 11/2001 | Kildea et al. | |
| 6,471,483 B2 | 10/2002 | London | |
| 6,726,452 B2 | 4/2004 | Strassberger et al. | |
| 6,767,168 B2 * | 7/2004 | Miller | 407/13 |
| 6,883,234 B2 | 4/2005 | Packman et al. | |
| 6,951,447 B2 | 10/2005 | Cherolis et al. | |
| 7,007,382 B2 * | 3/2006 | Mantel | 29/889.2 |
| 7,101,263 B2 | 9/2006 | Schwartz et al. | |
| 7,690,896 B2 | 4/2010 | Stevens et al. | |
| 7,761,992 B2 | 7/2010 | Packman et al. | |
| 2005/0015983 A1 | 1/2005 | Mantel | |
| 2011/0129310 A1 | 6/2011 | Dessoly et al. | |
| 2013/0064619 A1 | 3/2013 | Belmonte et al. | |

FOREIGN PATENT DOCUMENTS

GB  190321309  5/1904

OTHER PUBLICATIONS

International search report for PCT/US2012/068527 dated Apr. 3, 2013.

* cited by examiner

*Primary Examiner* — Richard Chang
(74) *Attorney, Agent, or Firm* — O'Shea Getz P.C.

(57) ABSTRACT

A method is provided for machining a slot having a slot base in a turbine engine rotor disk. The method includes forming a preform slot that extends along a longitudinal axis through the rotor disk. The preform slot includes a preform slot endwall connected laterally between a first slot sidewall and a second slot sidewall. A cutting tool is rotated about its axial centerline, which is substantially parallel to the longitudinal axis. The preform slot endwall is machined with the rotating cutting tool to form the slot base.

16 Claims, 3 Drawing Sheets

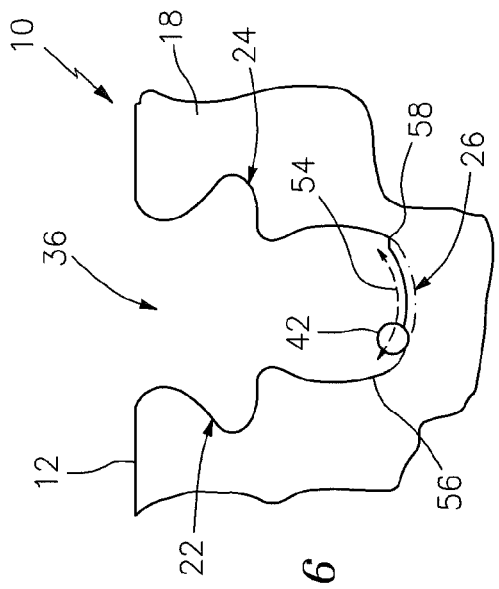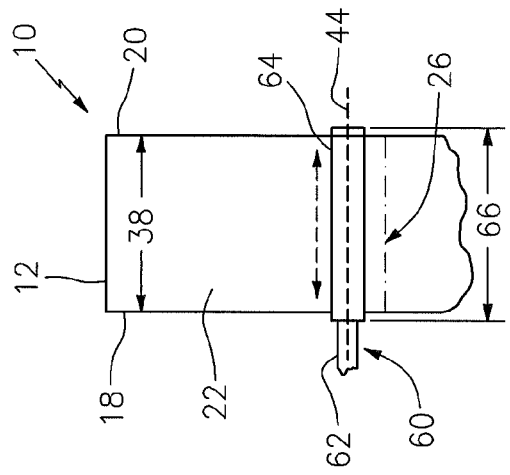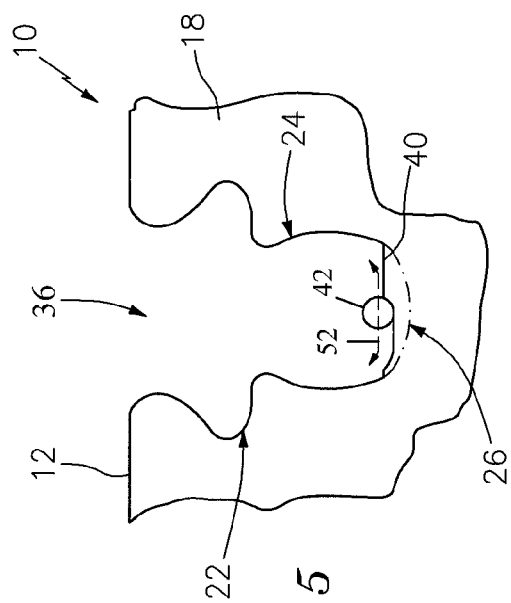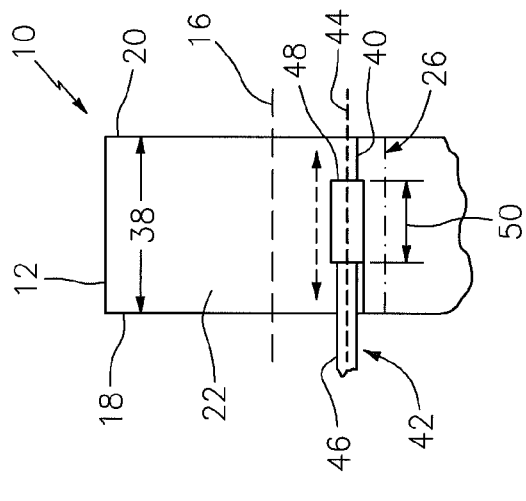

METHOD FOR MACHINING A SLOT IN A TURBINE ENGINE ROTOR DISK

BACKGROUND OF THE INVENTION

1. Technical Field

The present invention relates generally to machining and, in particular, to a method for machining a slot in a turbine engine rotor disk.

2. Background Information

In turbine engines such as gas turbine engines, fan blades, compressor blades and turbine blades are typically arranged circumferentially around respective rotor disks. Each blade may include a fir tree root connected to an airfoil. The fir tree root is inserted into a respective fir tree slot in the rotor disk in order to secure the blade to the rotor disk.

Various methods are known in the art for machining fir tree slots into a rotor disk. A slot may be machined into a rotor disk using, for example, super abrasive machining or milling methods. Prior art super abrasive machining and milling methods, however, typically utilize expensive, custom built cutting tools that are often subject to relatively long tool-workpiece contact lengths and relatively high specific material removal rates near the cutting tool tip.

SUMMARY OF THE DISCLOSURE

According to a first aspect of the invention, a method is provided for machining a slot having a slot base in a turbine engine rotor disk. The method includes forming a preform slot that extends along a longitudinal axis through the rotor disk. The preform slot includes a preform slot endwall connected laterally between a first slot sidewall and a second slot sidewall. A cutting tool is rotated about its axial centerline, which is substantially parallel to the longitudinal axis. The preform slot endwall is machined with the rotating cutting tool to form the slot base.

According to a second aspect of the invention, a method is provided for machining a slot base into a turbine engine rotor disk having a preform slot that extends along a longitudinal axis through the rotor disk. The preform slot includes a preform slot endwall connected laterally between a first slot sidewall and a second slot sidewall. The method includes rotating a cutting tool about its axial centerline. The cutting tool is positioned such that the axial centerline is substantially parallel to the longitudinal axis. The preform slot endwall is machined with the rotating cutting tool to form the slot base.

The foregoing features and the operation of the invention will become more apparent in light of the following description and the accompanying drawings.

BRIEF DESCRIPTION OF THE DRAWINGS

FIG. 5 is a partial illustration of a rotary cutting tool machining a slot base into a rotor disk with a preform slot;

FIG. 6 is another partial illustration of a rotary cutting tool machining a slot base into a rotor disk;

FIG. 7 is a partial, cross-sectional illustration of the rotary cutting tool and the rotor disk illustrated in FIG. 5; and FIG. 8 is a partial, cross-sectional illustration of an alternate embodiment rotary cutting tool machining a slot base into a rotor disk with a preform slot.

DETAILED DESCRIPTION OF THE INVENTION

Figure 1:
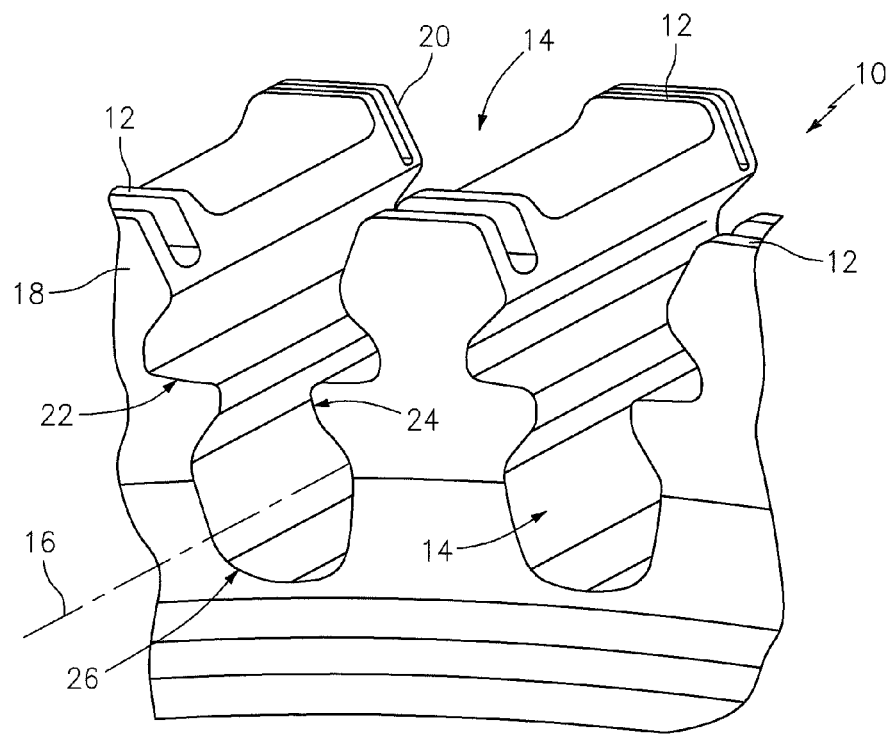
FIG. 1 is a partial perspective illustration of a gas turbine engine rotor disk that includes a plurality of blade root retention slots.

FIG. 1 illustrates a turbine engine rotor disk 10 (e.g., a turbine rotor disk for a gas turbine engine) that includes a radial outer disk surface 12 and a plurality of slots 14 (e.g., blade root retention slots). Each slot 14 extends along a longitudinal axis 16 through the rotor disk 10 between a first disk end 18 and a second disk end 20. Each slot 14 includes a first slot sidewall 22, a second slot sidewall 24 and a slot base 26. The first slot sidewall 22 and the second slot sidewall 24 each extend radially inwards from the outer disk surface 12 to the slot base 26. The first slot sidewall 22 and/or the second slot sidewall 24 may each have a complex (e.g., tortuous) cross-sectional geometry that provides the slot 14 with, for example, a fir tree configuration. The slot base 26 extends laterally (e.g., perpendicularly to the longitudinal axis 16) between the first slot sidewall 22 and the second slot sidewall 24, and may have a concaved, curved cross-sectional geometry.

Figures 3, 4:
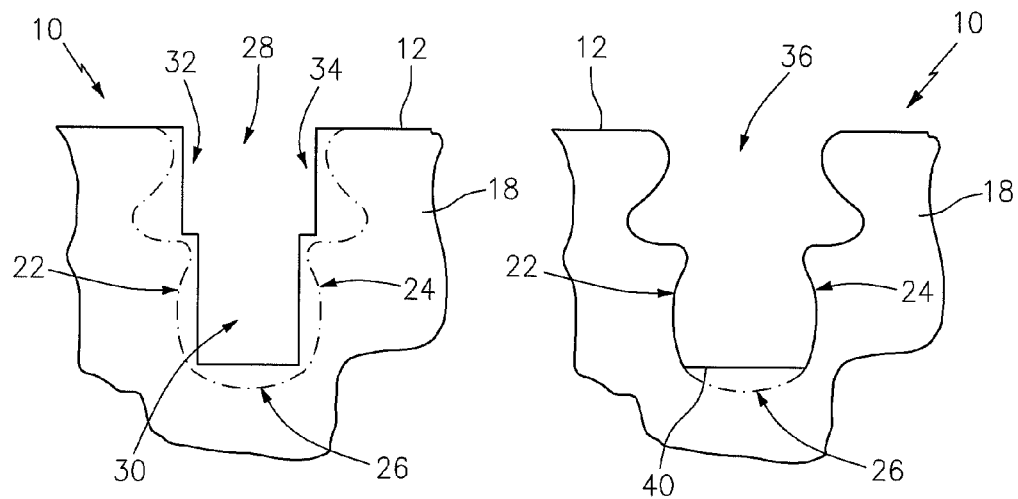
FIG. 3 is a partial illustration of a rotor disk with a base slot formed therein.
FIG. 4 is a partial illustration of a rotor disk with a preform slot formed therein.
Figure 2:
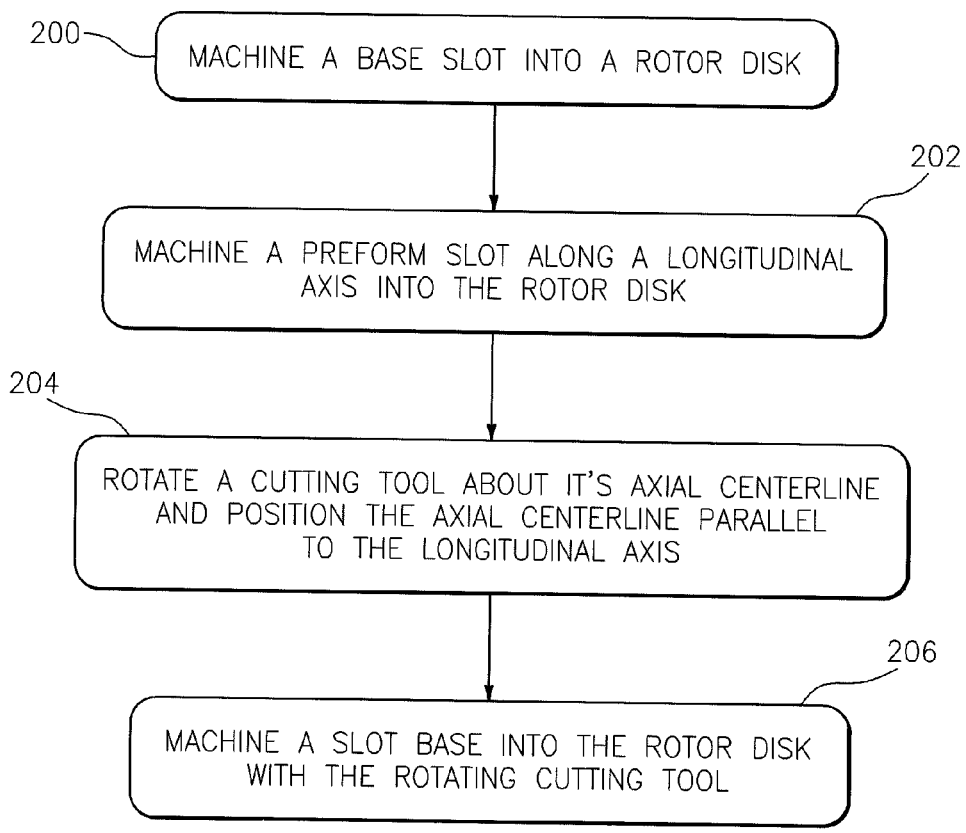
FIG. 2 is a flow diagram of a method for machining one of the slots in the rotor disk illustrated in FIG. 1.

FIG. 2 is a flow diagram of a method for machining one of the slots 14 in the rotor disk 10 illustrated in FIG. 1. FIG. 3 is a partial illustration of a rotor disk 10 (e.g., a rotor disk blank) with a base slot 28 formed therein. Referring to FIGS. 2 and 3, in step 200, the base slot 28 is machined into the rotor disk 10 with, for example, a rotary cutting wheel (e.g., grinding wheel). The base slot 28 extends longitudinally through the rotor disk 10, and may include a base segment 30 located between a first side segment 32 and a second side segment 34. An example of a cutting wheel for machining a base slot is disclosed in U.S. Pat. No. 7,007,382, which is hereby incorporated by reference in its entirety, and is commonly assigned to the assignee of the present invention. Other examples of a cutting wheel for machining a base slot are disclosed in U.S. Pat. Nos. 6,883,234 and 7,761,992, which are hereby incorporated by reference in their entirety, and are also commonly assigned to the assignee of the present invention.

FIG. 4 is a partial illustration of the rotor disk 10 with a preform slot 36 (also referred to as a "precursor slot" or a "pre-slot") formed therein. Referring to FIGS. 2 and 4, in step 202, the preform slot 36 is machined into the rotor disk 10 with, for example, a rotary super abrasive quill. The super abrasive quill may be moved, for example, longitudinally through the base slot 28 in order to machine the preform slot 36. Referring to FIG. 7, the preform slot 36 has a preform slot length 38 that extends longitudinally between the first disk end 18 and the second disk end 20. Referring to FIG. 4, the preform slot 36 includes a preform slot endwall 40 connected laterally between the first slot sidewall 22 and the second slot sidewall 24. An example of a rotary super abrasive quill for machining a preform slot is disclosed in U.S. Pat. No. 7,007,382.

FIG. 5 is a partial illustration of a rotary cutting tool 42 machining the slot base 26 into the rotor disk 10. FIG. 6 is another partial illustration of the cutting tool 42 machining the slot base 26 into the rotor disk 10. FIG. 7 is a partial, cross-sectional illustration of the cutting tool 42 and the rotor disk 10 illustrated in FIG. 5. Referring to FIGS. 2 and 5-7, in step 204, the cutting tool 42 is rotated about an axial centerline 44 thereof Referring to FIG. 7, the cutting tool 42 is arranged such that the axial centerline 44 is substantially parallel to the longitudinal axis 16. The cutting tool 42 may include a shaft 46 and a cutting element 48 (e.g., a substantially cylindrical or barrel shaped cutting element). The cutting element 48 has a cutting element length 50 that extends along the axial centerline 44. In some embodiments, the cutting element 48 may be a super abrasive cutting element with, for example, cubic boron nitride super abrasive cutting particles. In other embodiments, the cutting element 48 may be a milling cutter (e.g., an end mill).

Referring again to FIGS. 2 and 5-7, in step 206, the slot base 26 is formed by machining rotor disk 10 material away from the preform slot endwall 40 with the rotating cutting element 48. The rotating cutting element 48 may be moved laterally, longitudinally and/or radially during the machining depending on the particular slot geometry and/or the design of the cutting tool 42. Referring to FIG. 5, for example, the rotating cutting element 48 may be moved laterally and/or radially along a first (e.g., semi-orbital) trajectory 52 to remove a first portion of the rotor disk 10 material. Referring to FIG. 6, the rotating cutting element 48 may subsequently be moved laterally and/or radially along a second (e.g., larger semi-orbital) trajectory 54 between the first slot sidewall 22 and the second slot sidewall 24 to remove a second portion of the rotor disk 10 material. The second trajectory 54 may be tailored to provide the slot base 26 with, for example, a smooth, uninterrupted curved cross-sectional geometry (e.g., as illustrated in FIG. 1). The second trajectory 54 may also be tailored to relocate mismatches, for example, radially along the first slot sidewall 22 and/or the second slot sidewall 24. The term "mismatch" is used herein to describe a cusp formed where two different machining operations intersect; e.g., at intersections 56 and 58 between the slot sidewalls and the slot base 26. Referring to FIG. 7, the rotating cutting element 48 may also be moved longitudinally during the removal of the first and/or the second portions of the rotor disk 10 material. The cutting tool 42 may be oscillated back and forth along the axial centerline 44 (e.g., between the first disk end 18 and the second disk end 20) where, for example, the cutting element length 50 is less than the preform slot length 38. The cutting tool 42 may also be oscillated to provide a relatively smooth slot surface finish and to reduce tool wear.

In some embodiments, the cutting tool may be connected to a multi-axis manipulator such as, for example, a 2-axis, 5-axis or 6-axis manipulator included in a computer numerical control (CNC) machine, etc.

In other embodiments, the preform slot may be alternatively formed using milling, broaching, super abrasive machining, abrasive water jet machining, wire electrical discharge machining, and/or wire saw machining.

FIG. 8 is a partial, cross-sectional illustration of an alternate embodiment rotary cutting tool 60 machining the slot base 26 into the rotor disk 10. The cutting tool 60 may include a shaft 62 and a cutting element 64 (e.g., a substantially cylindrical cutting element). The cutting element 64 has a cutting element length 66 that extends along the axial centerline 44, where the cutting element length 66 is greater than the preform slot length 38. In alternative embodiments, however, the cutting element length may be substantially equal to the preform slot length.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A method for machining a slot comprising a slot base in a turbine engine rotor disk, comprising:

forming a preform slot that extends along a longitudinal axis through the rotor disk, the preform slot comprising a preform slot endwall connected laterally between a first slot sidewall and a second slot sidewall;

rotating a cutting tool about an axial centerline of the cutting tool, wherein the axial centerline is substantially parallel to the longitudinal axis; and machining the preform slot endwall with the rotating cutting tool to form the slot base, wherein the machining comprises moving the rotating cutting tool laterally between the first slot sidewall and the second slot sidewall, and the rotating cutting tool is moved laterally along a semi-orbital trajectory.

2. The method of claim 1, wherein the machining further comprises moving the rotating cutting tool along the axial centerline.

3. The method of claim 2, wherein the cutting tool comprises a cutting element comprising a cutting element length that extends along the axial centerline, and the preform slot comprises a preform slot length that extends along the longitudinal axis and that is greater than the cutting element length.

4. The method of claim 2, wherein the cutting tool comprises a cutting element comprising a cutting element length that extends along the axial centerline, and the preform slot comprises a preform slot length that extends along the longitudinal axis and that is less than the cutting element length.

5. The method of claim 2, wherein the moving of the rotating cutting tool along the axial centerline comprises oscillating the rotating cutting tool back and forth along the axial centerline.

6. The method of claim 1, wherein the cutting tool comprises a substantially cylindrical cutting element that machines the slot endwall to form the slot base.

7. The method of claim 1, wherein the cutting tool comprises a barrel-shaped cutting element that machines the slot endwall to form the slot base.

8. The method of claim 1, wherein the cutting tool comprises a super abrasive cutting element that machines the slot endwall to form the slot base.

9. The method of claim 1, wherein the cutting tool comprises a milling cutter.

10. The method of claim 1, wherein the slot comprises a blade root retention slot.

11. The method of claim 10, wherein at least one of the first slot sidewall and the second slot sidewall comprises a tortuous cross-sectional geometry.

12. The method of claim 10, wherein the forming of the preform slot comprises machining a base slot into the rotor disk with a cutting wheel, and moving a super abrasive quill through the base slot to machine the preform slot.

13. The method of claim 1, wherein the forming of the preform slot comprises at least one of milling, broaching, super abrasive machining, abrasive water jet machining, wire electrical discharge machining, and wire saw machining.

14. A method for machining a slot base into a turbine engine rotor disk comprising a preform slot that extends along a longitudinal axis through the rotor disk, the preform slot comprising a preform slot endwall connected laterally between a first slot sidewall and a second slot sidewall, the method comprising:

rotating a cutting tool about an axial centerline of the cutting tool;

positioning the cutting tool where the axial centerline is substantially parallel to the longitudinal axis; and machining the preform slot endwall with the rotating cutting tool to form the slot wherein the machining comprises moving the rotating cutting tool laterally between the first slot sidewall and the second slot sidewall, and the rotating cutting tool is moved laterally along a semi-orbital trajectory.

15. The method of claim 14, wherein the machining further comprises moving the rotating cutting tool along the axial centerline.

16. The method of claim 14, wherein the cutting tool comprises a substantially cylindrical cutting element that machines the slot endwall to form the slot base.

* * * * *